United States Patent
Frankel et al.

(10) Patent No.: US 7,313,701 B2
(45) Date of Patent: *Dec. 25, 2007

(54) ROBUST EFFICIENT DISTRIBUTED RSA-KEY GENERATION

(75) Inventors: Yair Frankel, Westfield, NJ (US);
Marcel M. Yung, New York, NY (US);
Philip D. MacKenzie, Maplewood, NJ (US)

(73) Assignee: CQR Cert, LLC, New York, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 09/860,441

(22) Filed: May 21, 2001

(65) Prior Publication Data

US 2001/0038696 A1    Nov. 8, 2001

Related U.S. Application Data

(63) Continuation of application No. 09/315,979, filed on May 21, 1999, now Pat. No. 6,237,097.

(51) Int. Cl.
*H04L 9/00*    (2006.01)

(52) U.S. Cl. ............... 713/180; 713/168; 713/172; 713/173; 713/174; 705/64

(58) Field of Classification Search .............. 380/30
See application file for complete search history.

(56) References Cited

U.S. PATENT DOCUMENTS 4,351,982 A    9/1982    Miller et al. ............... 380/30

6,237,097 B1 *    5/2001    Frankel et al. ............... 713/180

OTHER PUBLICATIONS

Davenport, J.H., "Primality Testing Revisited", Papers from the International Symposium on Symbolic and algebraic Computation, 1992, ACM, pp. 123-129.

Alexi et al., RSA and Rabin Functions: "Certain Parts Are As Hard As The Whole", Apr. 1988, vol. 17, n. 2, pp. 194-209, In SIAM Journal of Computing.

(Continued)

*Primary Examiner*—Kambiz Zand
*Assistant Examiner*—Roderick Tolentino
(74) *Attorney, Agent, or Firm*—Steptoe & Johnson LLP

(57) ABSTRACT

The invention provides for robust efficient distributed generation of RSA keys. An efficient protocol is one which is independent of the primality test "circuit size", while a robust protocol allows correct completion even in the presence of a minority of arbitrarily misbehaving malicious parties. The disclosed protocol is secure against any minority of malicious parties (which is optimal). The disclosed method is useful in establishing sensitive distributed cryptographic function sharing services (certification authorities, signature schemes with distributed trust, and key escrow authorities), as well as other applications besides RSA (namely: composite ElGamal, identification schemes, simultaneous bit exchange, etc.). The disclosed method can be combined with proactive function sharing techniques to establish the first efficient, optimal-resilience, robust and proactively-secure RSA-based distributed trust services where the key is never entrusted to a single entity (i.e., distributed trust totally "from scratch"). The disclosed method involves new efficient "robustness assurance techniques" which guarantee "correct computations" by mutually distrusting parties with malicious minority.

47 Claims, 1 Drawing Sheet

OTHER PUBLICATIONS

Ben-Or M. et al., "Completeness Theorem for Non cryptographic Fault-tolerant Distributed Computing", STOC 1988, pp. 1-10, ACM.

Blum, M. "Coin Flipping By Telephone: a protocol for solving impossible problems," 1982, pp. 133-137, IEEE Computer Conference.

D. Boneh et al., Efficient Generation of Shared RSA Keys, Crypto 97, pp. 425-439.

Boyd, C., Digital Multisignatures, IMA Conference on Cryptography and Coding, 1986, pp. 241-246, Claredon Press (eds. H. Baker and F. Piper).

Brassard et al., Computationally Convincing Proofs Of Knowledge, In Proceedings of the $8^{th}$ Symp. On Theoretical Aspects of Computer Science, pp. 251-262, (Springer, Berlin, 1991).

Brickell et al., Exponentiation with Precomputation Advances in Cryptology—Eurocrypt 92 Proceedings, Lecture Notes in Computer Science, vol. 658, 1992, R. Rueppel ed., Springer-Verlag.

Chaum et al., Multiparty Unconditionally Secure Protocols, STOC 1988, pp. 11-19, ACM.

Chaum, D. et al. An Improved Protocol for Demonstrating Possession of Discrete Logarithms and Some Generalizations, Advances in Cryptology—Crypto 86 Proceedings, vol. 263, Lecture Notes in Computer Science, 1986, pp. 200-212 Springer-Verlag, A. Odlyzko ed.

Chor et al. "Verifiable Secret Sharing and Achieving Simultaneous Broadcast," Proceeding of the $26^{th}$ Symposium on Foundations of Computer Science, IEEE, pp. 235-344, 1985.

DeSantis et al. How To Share A Function Securely, ACM Proceedings of the $26^{th}$ Annuyal Symposium on Theory of Computing, 1994, pp. 522-533, ACM.

Desmedt et al., Threshold Cryptosystems, Advances in Cryptology—Crypto 89 Proceedings, vol. 435, Lecture Notes in Computer Science, 1989, pp. 307-315, Springer-Verlag, G. Brassard ed.

Diffle et al. New Directions in Cryptography, IEE Trans. on Information Theory 22(6), 1976, pp. 644-654.

Feldman et al., "A Practical Scheme for Non-Interactive Certifiable Secret Sharing", Proceedings of the $28^{th}$ Symposium on Foundations of Computer Science, IEEE, 1987, pp. 427-437.

Fiat et al., "How To Prove Yourself: Practical Solutions To Identification and Signature Problems," in Advances in Cryptology—Crypto '86 Proceedings, vol. 263, Lecture Notes in Computer Science, 1987, pp. 186-194, Springer-Verlag, New York (ed. A. Odlyzko).

Frankel et al., "Witness Based Cryptographic Program Checking and Robust Function Sharing", Proceedings of the $28^{th}$ Annual Symposium on Theory of Computing, 1996, pp. 499-508, ACM.

Frankel et al., "Proactive RSA", Crypto 97.

Frankel et al., "Optimal Resilience Proactive Public-Key Cryptosystems", FOCS 97.

Feige et al., "Zero Knowledge Proofs of Knowledge in Two Rounds", pp. 526-544, Crypto 1989.

Feige et al., "Zero Knowledge Proofs of Identity", The Weizmann Institute of Science, Department of Applied Mathematics, Rohovot, Israel, ACM Press pp. 210-217.

Franklin et al., "Secure and Efficient Off-line Digital Money", Porch. of the $20^{th}$ Int. Col. On Automata, Languages and Programming (ICALP), 1993, LNCS 700, Springer-Verlag, pp. 265-276.

Galil et al., Minimum-Knowledge Interactive Proof for Decision problems, SIAM Computer Journal, vol. 18, 9189, pp. 711-739.

Galil et al., Symmetric Public-Key Cryptography,m Crypto 85.

Galil et al., "Cryptographic Computations: Secure Fault Tolerant Protocols in the Public Key Model", Crypto 87, pp. 135-155.

Gennaro et al., "Robust Threshold DSS Signatures", Advances in Cryptology—Eurocrypt 96 Proceedings, vol. 1070, Lecture Notes in Computer Science, 1996, pp. 354-371, Springer-Verlag.

Goldreich, O., "On Foundations of Modern Cryptography", Crypto 97, an invited paper.

Goldreich et al., "Proofs That Yield Nothing But Their Validity And a Methodology of Cryptographic Protocol Design," IEEE FOCS, pp. 174-187, 1986.

Goldreich et al., "How To Play Any Mental Game", Proceedings of the $19^{th}$ Annual ACM Symposium, 1987, pp. 218-229, Theory of Computing.

Goldwasser, S., "A New Direction In Cryptography: Twenty Something Years After", FOCS 97, an invited paper.

Goldwasser et al., "The Knowledge Complexity of Interactive Proof-Systems", SIAM Journal on Computing, vol. 18(1), 1989, pp. 186-208.

Hardy et al. An Introduction To The Theory Of Numbers, 1985, Oxford Science Publications, London, Great Britain, $5^{th}$ ed.

Impagliazzo et al., "Direct Minimum-Knowledge Computation", in Advances in Cryptology—Crypto '87, Proceedings, 1988, Lecture Notes in Computer Science, vol. 293, Springer-Verlag, New York, ed. C. Pomerance, 40-50.

Kilian, J., "Founding Cryptography On Oblivious Transfer,", 1988, ACM STOC, pp. 20-31.

Miller, G., "Riemann's Hypothesis And Test of Primality", Journal of Computer and System Sciences, vol. 13, 1976, pp. 300-317.

Okamoto, T., "Provably Secure and Practical Identification and Corresponding Signature Scheme, Advances in Cryptology"—Crypto 92 Proceedings, vol. 740, Lectures Notes in Computer Science, 1992 Springer-Verlag, pp. 31-53 (E. Brickell ed.).

Ostrovsky et al., "How To Withstand Mobile Virus Attacks", Proceedings of the $10^{th}$ ACM Symposium on the Principles of Distributed Computing, pp. 51-61, 1991.

Pedersen, T.P., "Distributed Provers With Applications to Undeniable Signatures", Advances in Cryptology—Eurocrypt 91 Proceedings, vol. 547, Lecture Notes in Computer Science, 1991, pp. 221-242, Springer-Verlag.

Pedersen, T.P., "A Threshold Cryptosystem Without A Trusted Party", Advances in Cryptology—Eurocrypt 91 Proceedings, vol. 547, Lectures Notes in Computer Science, 1991, pp. 129-140, Springer-Verlag.

Pedersen, T.P., "Non-interactive And Information theoretic Secure Verifiable Secret Sharing", Advances in Cryptology—Crypto 91 Proceedings, vol. 576, Lecture Notes in Computer Science, 1991, pp. 129-140, Springer-Verlag.

Rivest et al., "A Method For Obtaining Digital Signature and Public Key Cryptosystems", vol. 21, Comm. of ACM, 1978, pp. 120-126.

Shamir, A. "How To Share A Secret", vol. 22, Comm. of ACM, 1979, pp. 612-613.

Yao, A.C., "Theory And Applications of Trapdoor Functions", Proceedings of the $23^{rd}$ Symposium on the Foundation of Compuer Science, 1982, pp. 80-91.

\* cited by examiner

ROBUST EFFICIENT DISTRIBUTED RSA-KEY GENERATION

This application is a continuation of U.S. patent application Ser. No. 09/315,979, May 21, 1999, now U.S. Pat. No. 6,237,097.

The application relates to the field of electronics and data processing, and particularly to methods and apparatus for generating cryptographic keys.

BACKGROUND

The notion of distributed cryptographic protocols has been in cryptography for over fifteen (15) years. Some protocols have been designed to solve communication problems which are impossible from an information-theoretic perspective, like the coin-flipping protocol [B82] and the millionaire-problem protocol [Y82]. Other protocols have been designed to solve generic problems. These protocols (called "general compiler protocols") can securely compute any public function on secure inputs. The first such protocols were developed by Yao [Y86] and Goldreich, Micali and Wigderson [GMW], and various developments were made in subsequent works, e.g., [GHY, K, BGW, CCD].

Recently there has been a thrust to construct more efficient protocols for problems involving the distributed application of cryptographic functions (surveyed in GW97). Function sharing protocols are needed to provide increased memory security, distributed trust, and flexible management (i.e., adding and deleting trustees) of crucial functions like certification authorities and group signatures.

A major efficiency difference between a general compiler protocol (which should be thought of as a plausibility result—see [Gr97]) and a function sharing protocol results from the fact that the communication complexity of the former depends linearly on the actual size of the circuit computing the cryptographic functions, while the communication complexity of the latter is independent of the circuit size (and is typically a polynomial in the input/output size and the number of participants). This difference (pointed out first in FY93, DDFY94) is crucial to practitioners who require efficient protocols. A function sharing protocol involves a protocol for applying the function (based on distributed shares), and sometimes (in what is called a "proactive model") also a protocol for re-randomizing the function shares.

Another important step regarding "distributed cryptographic functions" is the (efficient) distributed generation of the function (the key shares). For cryptographic functions based on modular exponentiation over a field (whose inverse is the discrete logarithm which is assumed to be a one-way function), a protocol for the distributed generation of keys was known [P2]. However, for the RSA function and related cryptographic functions to be described below, which requires the generation of a product of two primes and an inverse of a public exponent, this step was an open problem for many years. Note that Yao's central motivation [Y86] is introducing general compiler protocols that "computer circuits securely in communication" was the issue of distributed generation of RSA keys. Indeed the results of [Y86, GMW] show the plausibility of this task.

Another step forward was achieved by Boneh and Franklin [BF97] who showed how a set of participants can generate an RSA function efficiently, thus detouring the inefficient compiler. They showed that their protocol was secure in the limited model of "trusted but curious" parties. They left open the issue of robustness, i.e., generation in the presence of misbehaving (malicious) parties. If adversaries misbehave arbitrarily, the Boneh-Franklin protocol may be prevented from ever generating a shared RSA key (due to lack of robustness).

The following references provide additional background for the invention.

[ACGS] W. Alexi, B. Chor, O. Goldreich and C. Schnorr. RSA and Rabin Functions: Certain Parts are as Hard as the Whole. In *SIAM Journal of Computing*, volume 17, n. 2, pages 194-209, April 1988.

[B84] E. Bach, "Discrete Logarithms and Factoring", Tech. Report No. UCB/CSD 84/186. Computer Science Division (EECS), University of California, Berkeley, Calif., June 1984.

[BGW] Ben-Or M., S. Goldwasser and A. Wigderson, *Completeness Theorem for Non cryptographic Fault-tolerant Distributed Computing*, STOC 1988, ACM, pp. 1-10.

[B82] M. Blum, "Coin flipping by telephone: a protocol for solving impossible problems," IEEE Computer Conference 1982, 133-137.

[BF97] D. Boneh and M. Franklin, *Efficient Generation of Shared RSA Keys*, Crypto 97, pp. 425-439.

[B88] C. Boyd, *Digital Multisignatures*, IMA Conference on Cryptography and Coding, Claredon Press, 241-246 (eds. H. Baker and F. Piper), 1986.

[BCLL] G. Brassard, C. Crepeau, S. Laplante, C. Leger. *Computationally Convincing proofs of knowledge*, In Proceedings of the $8^{th}$ Symp. On Theoretical Aspects of Computer Science (Springer, Berlin, 1991), pp. 251-262.

[BGM] E. Brickell, D. Gordon and K. McCurley. *Fast Exponentiation with Precomputation Advances in Cryptology*—Eurocrypt 92 Proceedings, Lecture Notes in Computer Science, Vol. 658, R. Rueppel ed., Springer-Verlag, 1992.

[CCD] D. Chaum, C. Crepeau and I. Damgard, *Multiparty Unconditionally Secure Protocols*, STOC 1988, ACM, pp. 11-19.

[CEG] D. Chau, M. -H. Evertse and J. van de Graff, *Multiparty computations ensuring privacy of each party's input and correctness of the result, Advances in Cryptology*—Europcrypt 88 Proceedings, Lecture Notes in Computer Science, Vol. 330, C. Gunther ed., Springer-Verlag, 1988 pp. 87-119.

[CEGP] D. Chaum, J. -H. Evertse, J van de Graaf and R. Peralta, *An improved protocol for demonstrating possession of discrete logarithms and some generalizations*, Advances in Cryptology—Crypto 86 Proceedings, Lecture Notes in Computer Science, Vol. 263, A. Odlyzko ed., Springer-Verlag, 1986, pp. 200-212.

[CGMA] B. Chor, S. Goldwasser, S. Micali and B. Awerbuch, *Verifiable Secret Sharing and Achieving Simultaneous Broadcast*, Proceedings of the $26^{th}$ Symposium on Foundations of Computer Science, IEEE, 1985, pp. 335-344.

[DDFY94] A. DeSantis, Y. Desmedt, Y. Frankel and M. Yung, *How to Share a Function Securely*, ACM Proceedings of the $26^{th}$ Annual Symposium on Theory of Computing, ACM, 1994, pp. 522-533.

[DF89] Y. Desmedt and Y. Frankel, *Threshold cryptosystems, Advances in Cryptology*—Crypto 89 Proceedings, Lecture Notes in Computer Science, Vol. 435, G. Brassard ed., Springer-Verlag, 1989, pp. 307-315.

[DH] W. Diffle and M. Hellman, *New Directions in Cryptography*, IEEE Trans. On Information Theory 22(6), 1976, pp. 644-654.

[FFS] U. Feige, A. Fiat and A. Shamir, *Zero-Knowledge Proof of Identity,*. Proceedings of the Nineteenth annual ACM symp. Theory of Computing, 1987, pp. 210-217.

[F] P. Feldman, *A Practical Scheme for Non-Interactive Certifiable Secret Sharing*, Proceedings of the 28$^{th}$ Symposium on Foundations of Computer Science, IEEE, 1987, pp. 427-437.

[FS86] A. Fiat and A. Shamir, "How to prove yourself: Practical solutions to identification and signature problems", in Advances in Cryptology—CRYPTO '86 Proceedings (Lecture Notes in Computer Science, Vol. 263), ed. A. Odlyzko 186-194, Springer-Verlag, New York, 1987.

[FGY] Y. Frankel, P. Gemmell and M. Yung, *Witness Based Cryptographic Program Checking and Robust Function Sharing*, Proceedings of the 28$^{th}$ Annual Symposium on Theory of Computing, ACM 1996, pp. 499-508.

[FGMY] Y. Frankel, P. Gemmel, P. MacKenzie and M. Yung, Proactive RSA, Crpto 97.

[FGMYa] Y. Frankel, P. Gemmel, P. MacKenzie and M. Yung, *Optimal Resilience Proactive Public-Key Cryptosystems*, FOCS 97.

[FS89] U. Feige and A. Shamir, *Zero knowledge proofs of knowledge in two rounds*, CRYPTO 1989, 20-24.

[FY93] M. Franklin and M. Yung, *Secure and Efficient Off-line Digital Money*, Porch. Of the 20$^{th}$ Int. Col. On Automata, Languages and Programming (ICALP), 1993, LNCS 700, Springer-Verlag, pp. 265-276.

[GHY] Z. Galil, S. Haber, and M. Yung, *Minimum-Knowledge Interactive Proof for Decision Problems*, SIAM j. Comp., 18, 9189, pp. 711-739.

[GHY85] Z. Galil, S. Haber and M. Yung, *Symmetric Public-Key Cryptography*, Crypto 85.

[GHY87] Z. Galil, S. Haber and M. Yung, *Cryptographic Computations: Secure Fault Tolerant Protocols in the Public Key Model*, Crypto 87, pp. 135-155.

[GJKR] R. Gennaro, S. Jarecki, H. Krawczyk, T. Rabin, *Robust Threshold DSS Signatures, Advances in Cryptology*—Eurocrypt 96 Proceedings, Lecture Notes in Computer Science, Vol. 1070, U. Maurer ed., Springer-Verlag, 1996, pp. 354-371.

[Gr97] O. Goldreich, *On Foundations of Modern Cryptography*, an invited paper, Crypto 97.

[GMW86] O. Goldreich, S. Micali and A. Wigderson, "Proofs that yield nothing but their validity and a methodology of cryptographic protocol design," IEEE FOCS 1986, pp. 174-187.

[GMW] O. Goldreich, S. Micali, and A. Wigderson, *How to play any mental game*, Proceedings of the Nineteenth annual ACM Symp. Theory of Computing, 1987, pp. 218-229.

[Gw97] S. Goldwasser, *A New Direction in Cryptography: Twenty something years after*, an invited paper, FOCS 97.

[GMR] A. Goldwasser, S. Micali and C. Rackoff, *The Knowledge Complexity of Interactive Proof-Systems*, Siam J. on Computing, 18(1) (1989), pp. 186-208.

[HW] G. Hardy and E. Wright, *An introduction to the theory of numbers*, Oxford Science Publications, London, Great Britain, fifth ed., 1985.

[HJJKY] A. Herzberg, M. Jakobsson, S. Jarecki, H. Krawczyk, M. Yung, *Proactive Public-Key and Signature Schemes*, Proceedings of the Fourth Annual Conference on Computer and Communications Security, ACM, 1996.

[IY87] R. Impagliazzo, and M. Yung, "*Direct minimum-knowledge computation*," in Advances in Cryptology— CRYPTO '87 Proceedings (Lecture Notes in Computer Science, Vol. 293), ed. C. Pomerance, 40-51, Springer-Verlag, New York, 1988.

[K] J. Kilian, "*Founding cryptography on oblivious transfer,*" ACM STOC 1988, 20-31.

[M76] G. Miller, *Riemann's Hypothesis and Test of Primality*, J. of Comp. And Syst. Sciences, 13, 300-317, 1976.

[OK92] T. Okamoto, *Provably Secure and Practical Identification and Corresponding Signature Scheme*, Advances in Cryptology—Crypto 92 Proceedings, Lecture Notes in Computer Science Vol. 740, E. Brickell ed., Springer-Verlag, 1992, pp. 31-53.

[OY91] R. Ostrovsky and M. Yung, *How to withstand mobile virus attacks*, Proc. of the 10$^{th}$ ACM Symposium on the Principles of Distributed Computing, 1991, pp. 51-61.

[P] T. P. Pedersen, *Distributed Provers with Applications to Undeniable Signatures*, Advances in Cryptology—Eurocrypt 91 Proceedings, Lecture Notes in Computer Science Vol. 547, D. Davies ed., Springer-Verglag, 1991, pp. 221-242.

[P2] T. P. Pedersen, *A threshold cryptosystem without a trusted party*, Advances in Cryptology—Eurocrypt 91 Proceedings, Lecture Notes in Computer Science Vol. 547, D. Davies ed., Springer-Verlag, 1991, pp. 129-140.

[P91] T. P. Pedersen, *Non-interactive and information theoretic secure verifiable secret sharing*, Advances in Cryptology—Crypto 91 Proceedings, Lecture Notes in Computer Science Vol. 576, J. Feigenbaum ed., Springer-Verlag, 1991, pp. 129-140.

[RSA] R. Rivest, A. Shamir and L. Adleman, *A Method for Obtaining Digital Signature and Public Key Cryptosystems*, Comm. of ACM, 21 (1978), pp. 120-126.

[Sh] A Shamir, *How to share a secret*, Comm. of ACM, 22 (1979), pp. 612-613.

[Y82a] A. C. Yao, *Theory and Applications of Trapdoor functions*, Proceedings of the 23rd Symposium on the Foundation of Computer Science, 1982, pp. 80-91.

[Y82] A. C. Yao, "*Protocols for secure computations*", IEEE FOCS 1982, 160-164.

[Y86] A. C. Yao, "*How to generate and exchange secrets*", IEEE FOCS 1986, 162-167.

SUMMARY

The preferred embodiment of the invention is a network of computers performing operations to generate a cryptographic key for use in an asymmetric (e.g., public/private) cryptosystem. The invention permits generation of a secret key by a group of computers. The process generates the key in the form of distributed shares in such a way that a (large enough) subset of computers have sufficient information to recover the key, and a subset of computers can perform cryptographic functions using the shares (e.g., signing a certificate). However, at no time during key share generation or key share use is the secret key actually formed. In one particularly preferred version, the method is secure against a number of misbehaving participants.

The preferred embodiment of the invention generates key shares for use in a cryptosystem that requires a number that is the product of two large prime numbers. The method proceeds generally in the following steps.

1. Setup;
2. Distributed generation of a value N;
3. Evaluation of the value N for a property of double primality;

4. Repetition of steps 2 and 3 as required;
5. Generation of key shares.

The invention has particular utility in cryptographic applications requiring maximum security against both external and internal adversaries. Robustness assures proper operation in various system conditions like errors, failures, attacks with which a distributed system is supposed to cope.

BRIEF DESCRIPTION OF THE PREFERRED EMBODIMENTS

Figure 1:
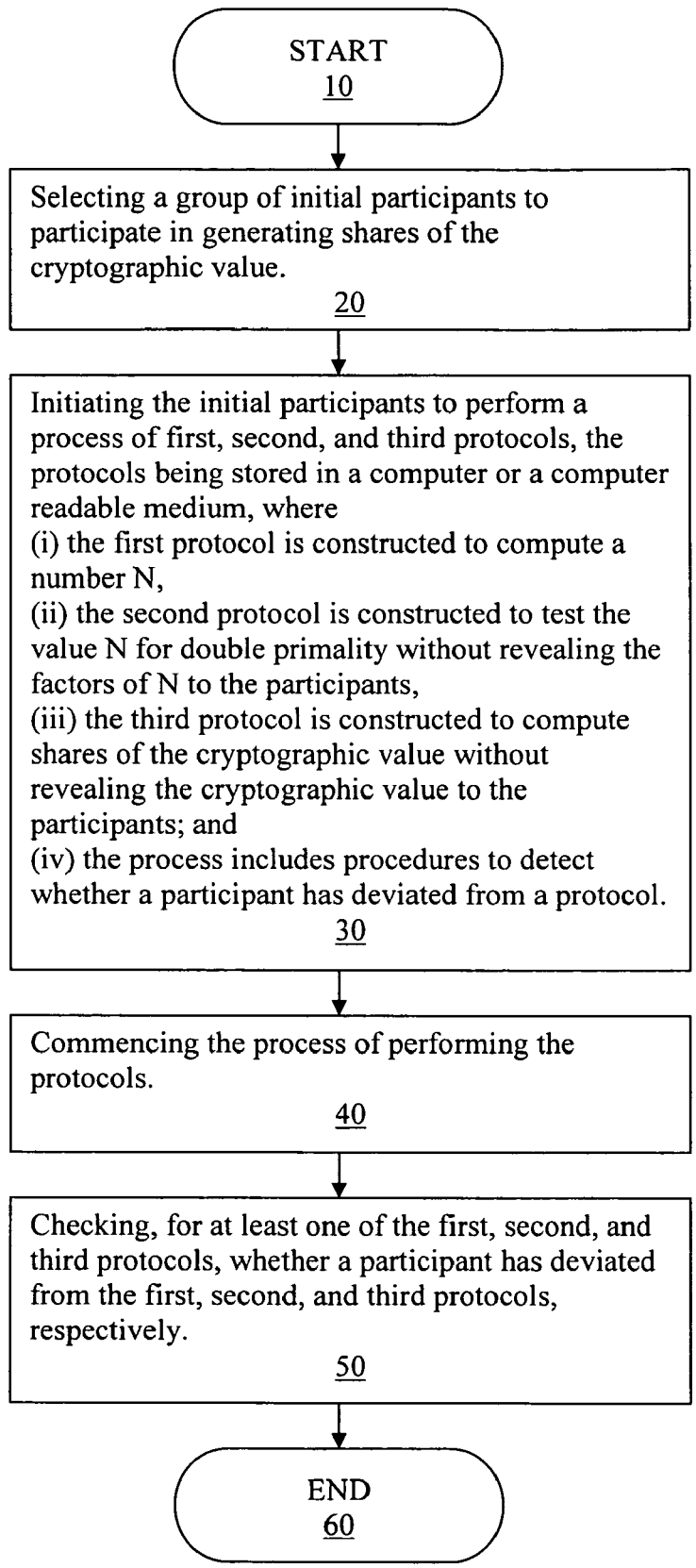
FIG. 1 illustrates an electronic method for generating shares of a cryptographic value.

Robustness has motivated basic notions in cryptography such as verifiable secret sharing [CGMA] and general zero-knowledge proofs [GMR]. The present invention provides for the robust, efficient and secure generation of shared RSA keys (or more generally, keys based on multiplying two large primes and exponentiation). It assumes a number n of participants that participate in generating shares of a cryptographic key. The participants may be programmed computers connected by a communication network. The method will successfully generate shares of a key for $n \geq 2t+1$, i.e., where at most t parties misbehave in any malicious and arbitrary way. The method achieves optimal resilience, since a majority of good participants is required. If $n \geq 3t+1$, a slightly more efficient variant of the protocol may be used.

Referring to FIG. 1, the method begins in step 10. In the next step 20, the method selects a group of initial participants to participate in generating shares of the cryptographic value. In the next step 30, the method initiates the initial participants to perform a process of first, second, and third protocols, the protocols being stored in a computer or a computer readable medium, where (i) the first protocol is constructed to compute a number N, (ii) the second protocol is constructed to test the value N for double primality without revealing the factors of N to the participants, (iii) the third protocol is constructed to compute shares of the cryptographic value without revealing the cryptographic value to the participants; and (iv) the process includes procedures to detect whether a participant has deviated from a protocol. In the next step 40, the method commences the process of performing the protocols. In the next step 50, the method checks for at least one of the first, second, and third protocols, whether a participant has deviated from the first, second, and third protocols, respectively. The method then ends in step 60.

Techniques of the present invention solve numerous other problems, because they can be employed to distributively initiate other cryptographic schemes based on composite numbers, such as: composite ElGamal encryption/signature, identification schemes where no participant is allowed to know the factorization of N (as in Feige, Fiat, Shamir [FFS]), and an efficient version of Yao's simultaneous bit exchange protocol [Y86].

The preferred embodiment of the invention is built upon the following novel techniques.

1. Multiplication protocols for shared "sum-of-poly" representations of values drawn from (1) a prime field (with robustness and security based solely on the hardness of the discrete logarithm problem), or (2) a subset of the integers (with robustness and security based solely on the hardness of the RSA problem, but without requiring a shared RSA modulus). The technique has potential in other applications since it is information-theoretically secure but also produces publicly verifiable witnesses which are held by the "community of servers."

2. Techniques for "chained-consistency" of shared information and its associated checking information, i.e., forcing checking information to be consistent over various computational tasks (e.g., generation protocols, multiplication protocols, and double primality tests) even when the representation of that checking information changes.

This Involves:
A. the idea of "cross-checking" information, i.e., maintaining consistency by verifying share information through check information, and moreover, verifying new checking information (perhaps a different representation) through share information. This duality of "checking and computing" is promising and is perhaps of independent interest;
B. efficient zero-knowledge arguments which verify that checking information is consistent;
C. a bootstrap technique assuring global checking by using a multitude of checking information w.r.t. individual keys.

Indeed, the techniques are general enough to cope with variations of many exponentiation-based cryptosystems and distributed protocols for applying these functions.

3. A commitment mechanism, called Simulator-Equivocal Commitments, which are as secure and efficient as normal commitments, but allow for certain simultability arguments on committed data which could not be accomplished with standard commitments. The mechanism leads to a new proof technique of security for result-producing protocols.

The protocol described below assures that distributed systems employing the RSA function (and the other functions mentioned above) can be initiated distributively as well. The techniques developed here can be used to construct a robust threshold DSS as in [GJKR], but with optimal resilience and with no additional cryptographic assumptions. The protocol is implementable in hardware or software or both.

The protocol is relatively efficient (it does not depend on the size of the circuit of primality tests as in the general compilers). In addition, the number of rounds can be made about the same as the number of rounds in a non-robust protocol, and the computation complexity (measured in the number of modular exponentiations) can be brought to about 100 times the computational complexity of a non-robust protocol, given reasonable values for the number of shareholders and security requirements, and a few modifications for efficiency as also discussed below.

The protocol is feasible and can be used in system initiation and key replacement in numerous systems (as mentioned above) and in various settings which require distributed trust. For example, shared public key replacement in a certification authority may be performed every three or five years, and thus need not be a "real time" operation. Therefore, a somewhat long (say, two-three week) protocol is reasonable. On the other hand a general compiler protocol which will take more than the five year period itself is unreasonable.

General System Description

The invention is preferably implemented in a network of computers. It has many advantages, particularly in terms of security against certain classes of adversaries as discussed below.

THE NETWORK: Preferred system uses a network of computers (shareholders) having properties satisfying the so-called "a model" similar to various recent works and also (BF97). The system has a group of n (probabilistic) servers, all connected to a common broadcast medium C, called the communication channel. Messages sent on C are assumed to instantly reach every party connected to it. The system is synchronized (and w.l.o.g. servers can be assumed to act synchronously). Implementations which satisfy the environment of the "model" can be based on known implementations of broadcast and multicast protocols, message sending protocols, encrypted and authenticated message sending protocols, and agreement protocols. These implementations are apparent based on the known and practiced art of computer communications (e.g., *Computer Networks*, Andrew Tanenbaum, Prentice-Hall, Inc., 1996).

THE ADVERSARY: The adversary is computationally bounded (i.e., it can not break the underlying cryptographic primitives) and it can corrupt servers at any moment by viewing the memories of corrupted servers and/or modifying their behavior. The adversary decides on whom to corrupt at the start of the protocol. It will be assume that the adversary corrupts no more than t out of n servers throughout the protocol, where $n \geq 2t+1$ (or $n \geq 3t+1$ for the more efficient protocol variant). For the purpose of classifying adversaries, malicious faults need not be differentiated from "normal" server failures (e.g., crashes). An adversaries can be connected to the broadcast channel C, which means it can hear all the messages and inject its own. It cannot, however, modify messages sent to C by a server that the adversary does not control, nor can it prevent a non-corrupted server from receiving a message sent on C.

In fact, the preferred protocol will be useful against a more mobile adversary [OY91], where the protocol proceeds in "trials" and each trial is independent of past trials. During a trial, misbehaving servers (including malicious adversaries) can be detected. A proper key can be generated, or the remaining servers (which were not caught deviating from the protocol) restart a new trial. Provided that the eliminated misbehaving servers till now are t', the protocol permits generation of a proper key if the adversary occupies t−1−t' new servers at the start of the new trial.

NOTATION: The description below will use the following notation. The term "sp" will be a security parameter, and the term $H=2^{(sp)}$. The subscripts "i", "j", and "k" designate individual elements indexed within a vector, and the subscript "*" designates the multitude of all elements in the vector (for describing parallel operations). The term $N_*$ will be the product of two unknown primes, each in the range $\sqrt{H}$, $2\sqrt{H}$. The terms g* and h* are generators whose discrete log mod N* with respect to each other is unknown. Indeed finding such an N* may be difficult, since that is the goal of the protocol.

In the description of the preferred protocol below, reference will be made to techniques known in the art for secret sharing [Sh], verifiable secret sharing [F], unconditionally secure verifiable secret sharing [P91], basic commitments using discrete logs over prime groups [P91], basic proofs of knowledge of discrete logs [GHY85, CEG, CEGP], and certain methods by which a number of parties can generate a random value by all committing to private random values, and then revealing those values. All publications referenced herein (both above and below) are hereby incorporated by reference in their entirety.

The Main Protocol

The main protocol proceeds in a series of steps as follows.
1. SETUP: The participants run the setup protocol for the SIMULATOR-EQUIVOCAL COMMITMENTS procedure as discussed below.
2. RESTARTING POINT: At the conclusion of the setup protocol, and periodically when the protocol returns to this point, a majority of participants agree which servers are "honest" and what is the upper bound on the number of misbehaving parties (given that some parties have been eliminated).
3. RUN THE DISTRIBUTED COMPUTATION OF N: There are to be $n \geq 2t+1$ (or $n \geq 3t+1$ for the more efficient multiplication protocol) shareholders $S_1, \ldots, S_n$. For purposes of description, let $L=n!$. Let sp be the security parameter, and let $H=2^{(sp)}$. The goal of the protocol is to compute:

$$N=(p_1+p_2+\ldots+p_n)(q_1+q_2+\ldots+q_n),$$

where the p's and q's are chosen randomly by the shareholders. Steps of the computation are as follows.

Each shareholder $S_i$ chooses $p_i, q_i \in_R [\frac{1}{2}\sqrt{H}, \sqrt{H}]$ (where the subscript "$_R$" denotes "random" and the symbol $\in_R$ refers to a random number in a set or interval).

Each shareholder $S_i$ uses the Shamir secret sharing scheme over the integers to distribute shares of its respective $p_i$ and $q_i$. For description purposes, the polynomial used to share $p_i$ is $a_i(x)$, and the polynomial used to share $q_i$ is $b_i(x)$.

Each shareholder $S_i$ uses the MULTIPLICATION SCHEME OVER THE INTEGERS procedure discussed below to compute $N=(p_1+p_2+\ldots+p_n)(q_1+q_2+\ldots+q_n)$.

Each shareholder $S_i$ proves to each other shareholder that its $p_i$ and $q_i$ are in the range $[0, 3/2\sqrt{H}]$ using the protocol PROOF OF KNOWLEDGE OF A DISCRETE LOG described below (over $g_*^{L^2}$ and $h_*$) with the zero-coefficient verification shares from the multiplication scheme.

If any shareholder misbehaves (as detected by failing to meet its proof), and the majority agrees that it is misbehaving, it is excluded from the rest of the protocol.

4. Run the ROBUST DISTRIBUTED DOUBLE-PRIMALITY TEST OF N. If N fails, the current "honest" (non-excluded shareholders) repeat the protocol from the RESTARTING POINT until a value of N satisfies the primality test.
5. Run the ROBUST DISTRIBUTED GENERATION OF PUBLIC AND PRIVATE KEYS. If N satisfies the primality test, remaining "honest" parties run one of the two protocols to determine public and private keys e and d. (The protocol for SMALL PUBLIC KEYS or LARGE PUBLIC KEYS can be chosen by system designers or operators depending on a choice of whether to use a small or large public exponent.)

The MAIN PROTOCOL uses a number of supporting protocols. Those supporting protocols are described below.

Simulator Equivocal Commitments

Commitments are used to simulate in electronic communication the notion of posting a value in a sealed envelope that can only be opened in one-way (a binding property), but until opened it is concealing the value in it (a security property).

A party B can commit to value for party A, such that the commitment is binding, but a simulator could produce a commitment that is non-binding. An earlier use of such a mechanism (although it is a less efficient one) is in [IY87]. Simulator-Equivocal commitments are basically trapdoor commitments [FS89] combined with a proof of knowledge of the trapdoor.

The preferred commitment mechanism uses the following setup protocol, which only needs to be run once for any number of commitments (by itself it uses regular commitments to set up the special commitments).

Setup:
  A strong prime P and a generator g for $Z^*_p$ are distributively chosen using techniques known in the art.
  Party A chooses a value $g' \in Z^*_p$ to be used for B's commitments to A, transmits $g'$ to B and proves to B that it knows the discrete log of g' base g. (This can be done using basic procedures for proving knowledge of discrete logs known in the art.)

Basic Commitments:
  In [P91], a protocol was developed in which party A can commit to a value information-theoretically, such that the commitment is computationally binding. Say there is a triple (g,h,P) with P=2P'+1 a strong prime, with the discrete log of g base h mod P unknown to A. A commits to a value x by publishing Commit=$g^x h^{x'}$ mod P for a random x'. When A wishes to open the commitment, A reveals x and x', and the other party may check if Commit≡$g^x h^{x'}$ mod P. It is shown in [P91] that if A is able to open its commitment two different ways, then it would know the discrete log of g base h mod P. A commitment is constructed just as in the Basic Commitment protocol, except that g and g' are used.
  B commits to a value $x \in Z_p$, by choosing $x' \in_R Z_{p'}$ and publishing Commit=$g^x g'^{x'}$ mod P.
  When B wishes to open the commitment, B reveals x and x', and A may check if Commit=$g^x g'^{x'}$ mod P.

Multiplication Scheme Over The Integers

The scheme for multiplication over the integers is a variation of a protocol for distributed multiplication over a prime field. Multiplication over a prime field will be described first, and modifications to permit multiplication over the integers will be described second.

Sum-of-Poly Multiplication Over A Prime Field

The protocol multiplies two secret values where each is represented as a sum of polynomials. Related protocols (over prime fields only) are described in [GJKR], however, as opposed to those protocols, the protocol described here is unconditionally secure, and is based on the difficulty of discrete logs with no additional assumptions.

The scheme uses semantically-secure public-key encryption for sending private messages between servers. The severs (shareholders) $S_1, \ldots, S_n$ (for $n \geq 2t+1$) can perform robust multiplication over a prime field while maintaining unconditional security. The goal of the protocol is to compute $C \equiv (A_1+A_2+\ldots+A_n)(B_1+B_2+\ldots+B_n)$ mod P' where $A_i$ and $B_i$ are chosen by $S_i$. (The variable C as used in this section will correspond to N of the MAIN PROTOCOL, $A_n$ will correspond to $p_n$ of the MAIN PROTOCOL, and $B_n$ will correspond to $q_n$ of the MAIN PROTOCOL.) The scheme proceeds in steps as follows.

1. Set Up
  For description purposes, let P=2P'+1 be a strong prime, and let g and h be generators of $Z_p^*$ (such that the discrete log of h over base g is unknown). Each server $S_i$ determines $A_i, B_i \in Z_{(p)'}$, and performs a Shamir secret sharing of those values with random polynomials:

$a_i(x) = \Sigma^t_{j=0} a_{i,j} x^j$ mod P';

and $b_i(x) = \Sigma^t_{j=0} b_{i,j} x^j$ mod P', where $a_i(0)=A_i$, and $b_i(0)=B_i$. Note that $Z_{p'} \equiv [1, 2, \ldots, P']$. Also note that each server has created a shared representation of their values $A_i, B_i$, but the servers have not yet distributed shares to other servers. If during the protocol any shareholder $S_i$ is determined to be corrupt, the remaining servers assume that $A_i=B_i=0$ for that server, and that throughout the protocol shares $A_i=B_i=0$ are equal to zero.

2. Pedersen Sharing of $A_i$ and $B_i$
  Servers share their respective values of $A_i$ and $B_i$ using a modification of the Pedersen sharing scheme. While Pedersen used his sharing scheme for implementing a verifiable secret sharing, the protocol described here uses the sharing as a base for efficient, robust, secure multiplication. The inputs to the multiplication protocol are generated as follows:

(a) Each server $S_i$ generates two companion secrets $A'_i, B'_i \in_R Z_p$, and shares them with Shamir secret sharing using random polynomials $a'_i(x)=\Sigma^t_{j=0} a'_{i,j} x^j$ mod P', $b'_i(x)= \Sigma^t_{j=0} b'_{i,j} x^j$ mod P', where $a'_i(0)=A'_i$ and $b'_i(0)=B'_i$. Each server also publishes the Pedersen verification shares for each pair $(a_i(x), a'_i(x))$ and $(b_i(x), b'_i(x))$: $\alpha_{i,j} = g^{a_{i,j}} h^{a'_{i,j}}$ mod P and $\beta_{i,j} = g^{b_{i,j}} h^{b'_{i,j}}$ mod P. Each server $S_k$ verifies its shares with the verification shares.

(b) For description purposes, define
  $A \equiv A_1+A_2+\ldots+A_n$ mod P',
  $A' \equiv A'_1+A'_2+\ldots+A'_n$ mod P',
  $B \equiv B_1+B_2+\ldots+B_n$ mod P', and
  $a(x) \equiv \Sigma^n_{i=1} a_i(x)$ mod P', $a'(x) \equiv \Sigma^n_{i=1} a'_i(x)$ mod P'.

Observe that the zeroth coefficients of the polynomials $a(x)$ and $a'(x)$ are A and A', respectively. Also note that the verification shares for pair $(a(x), a'(x))$ can be computed by all shareholders as follows:

$\alpha_j = \Pi^n_{i=0} g^{a_{i,j}} h^{a'_{i,j}}$ mod P.

3. Generation of Randomizing Polynomials
  Each server $S_i$ further generates random polynomials:

$z_i(x) = \Sigma^{2t}_{j=1} z_{i,j} x^j$ mod P';

and $z'_i(x) = \Sigma^{2t}_{j=1} z'_{i,j} x^j$ mod P'.

Servers distribute shares of these polynomials, and broadcast verification shares $\rho_{i,j} = g^{z_{i,j}} h^{z'_{i,j}}$ for $1 \leq j \leq 2t$. (Note that $z_i(0)=z'_i(0)=0$, and $\rho_{i,0}=1$ for $1 \leq i \leq n$.) Each server j verifies its received polynomial shares with the received verification shares.

Each server $S_i$ also generates a random polynomial $r_i(x) \equiv \Sigma^{2t}_{j=0} r_{i,j} x^j$ mod P', and distributes shares of this polynomial.

4. Generate and Verify Shares of Randomized A (x) $B_i(x)$ and A (x) $B'_i(x)$:

All shareholders locally compute shares of $v_i(x)$ and $v'_i(x)$ using previously received shares as:

$$v_i(x) \equiv a(x)b_i(x) + z_i(x);$$

and $$v'_i(x)) \equiv a'(x)b_i(x) + z'_i(x) = r_i(x).$$

Each server $S_i$ broadcasts verification shares $V_{i,j}$ for the polynomial pair $(v_i(x), v'_i(x))$ as:

$$V_{i,j} = \prod_{u+v=j} (\alpha_u)^{b_{i,v}} \rho_{i,j} h^{r_{i,j}}$$

All servers $S_i$ can check to see whether local shares match public shares. On a dispute as to the correct $v_i(j)$ values, $S_j$ challenges $S_i$ to reveal the shares $b_i(j)$ and $r_i(j)$. All shareholders can determine if $b_i(j)$ fits the verification shares for $b_i(x)$, and they can check if the share $v_i(j)$ fits the verification shares for $v_i(x)$ by computing $(g^{a(j)}h^{a'}{}_{(j)})^{b_i(j)}(g^{z_i(j)}h^{z'_i(j)})h^{r_i(j)}$ mod P, where $g^{a(j)}h^{a'(j)}$ mod P can be computed from the $\alpha$ verification shares for $(a(x), a'(x))$, and $g^{z_i(j)}h^{z'_i(j)}$ mod P can be computed from the $\rho$ verification shares for $(z_i(x), z'_i(x))$.

5. Prove Correctness of Verification Shares

For $1 \leq i \leq n$, each server $S_i$ proves to all others that for $1 \leq j \leq n$, it knows representations of $g^{b_i(j)}h^{b'_i(j)}$ mod P and $(g^{a(j)}h^{a'(j)})^{b_i(j)}h^{r_i(j)}$ mod P, where the discrete logs of g in the first and $g^{a(j)}h^{a'(j)}$ mod P in the second are the same. This is only necessary for the case where $2t+1 \leq n \leq 3t$.

6. Outputs:

Each $S_k$ computes and reveals v(k) and v'(k), where $$v(x) \equiv \Sigma^n_{i=1} v_i(x) \bmod P';$$

and $$v'(x) \equiv \Sigma^n_{i=1} v'^i(x) \bmod P',$$

Each server interpolates the resulting values to get v(0). This value is the result of the desired multiplication, because $v(0) \equiv AB \equiv C \bmod P'$.) Note that the verification shares for the polynomials v(x) and v'(x) can be computed from the verification shares from the previous step. All revealed shares are verified using the verification shares.

Basic Techniques Over The Integers

The MAIN protocol requires multiplication over the integers, whereas the basic scheme described above achieves multiplication over a finite field. The above scheme (over a finite field) can be modified as follows to perform multiplication over the integers.

1. SECRET SHARING OVER THE INTEGERS [FGMYa]

The Shamir secret sharing techniques over a prime field that was used above is modified with a variant for use over the integers. This is a variant of Shamir secret sharing [Sh]. For description purposes, let L=n!. For sharing a secret $s \in [0,K]$, a party chooses a random polynomial $a(x) = \Sigma^t_{j=0} a_j x^j$ such that $a_o = L^2 s$, and each other $a_j \in_R [0, L, 2L \ldots L^3 K^2]$. Each shareholder $i \in \{1, \ldots, n\}$ receives a secret share $s_i = a(i)$. Any set $\Lambda$ of cardinality t+1 can compute s using LaGrange interpolation.

2. Pedersen Unconditionally Secure VSS Over The Integers

Pederson sharing steps over a prime field that were used above are modified with a variant for use over the integers. This is a variant of Pedersen Unconditionally Secure VSS [P91]. For description purposes, assume the term "sp" is the security parameter, and let $H = 2^{sp}$. Also assume $N_*$ is the product of two unknown primes, each in the range $[\sqrt{H}, 2\sqrt{H}]$, and $g_*$ and $h_*$ are generators whose discrete Log mod $N_*$ may be difficult to determine (since determining $N_*$ is an object of the invention). In this case, each member $S_k$, can choose a triple $(N_k, g_k, h_k)$ and broadcast it.

The protocol begins with n+1 secret sharings: the first being a Shamir sharing of the secret over the integers, and the next n being sharings of companion secrets using the variant of Shamir sharing over the integers as described above. Specifically, for a secret $s \in [0,K]$, a party chooses a random polynomial $a(x) = \Sigma^t_{j=0} a_j x^j$ such that $a_0 \equiv L^2 s$, and each other $a_j \in_R [0, L, 2L, \ldots, L^3 K^2]$. Then for each triple $(N_k, g_k, h_k)$, the party chooses a random polynomial $a'_k(x) = \Sigma^t_{j=0} a'_{j,k} x^j$ with each $a'_{j,k} \in_R [0 \ldots L^3, K^3]$. Then the party sends shares of each polynomial to each shareholder (n+1 total shares to each shareholder) and publishes the verification shares $\{g_k^{a_j} h_k^{a'_{j,k}} \bmod N_k\}_{0 \leq j \leq t, \ 1 \leq k \leq n}$. Each shareholder $S_k$ can verify its shares a(k) and $a'_{k'}(k)$ using the verification shares over $N_k$, (for all $1 \leq k' \leq n$).

3. Sum-of-Poly Multiplication Over The Integers

The SUM-OF-POLY MULTIPLICATION OVER A FINITE FIELD can be modified as follows to perform multiplication over the integers. The protocol is unconditionally secure, but only in the statistical sense.

The protocol uses semantically-secure public-key encryption for sending private messages between servers. This protocol allows servers (shareholders) $S_1, \ldots S_n$ (for $n \geq 2t+1$) to perform robust multiplication over the integers while maintaining unconditional security. The goal of the protocol is to compute $C \equiv (A_1 + A_2 + \ldots + A_n)(B_1 + B_2 + \ldots + b_n) \bmod P'$ where $A_i$ and $B_i$ are chosen by $S_i$ from the range $[\frac{1}{2}\sqrt{H}, \sqrt{H}]$. (The adversary may choose values from outside this range.)

The protocol is the same as that of the previous section except that the share computation is performed over the integers rather than mod P', the verification and check share computations are performed mod $N_*$ rather than mod P, and with the following specific changes:

Step 1 (SETUP): For each i, the zeroth coefficients of $a_i(x)$ and $b_i(x)$ will be $L^2 A_i$ and $L^2 B_i$, respectively.

Step 2b (PEDERSON SHARING OF $A_i$ and $B_i$): The zeroth coefficients of a(x) will be $L^2 A$ instead of A.

Step 3 (GENERATION OF RANDOMIZING POLYNOMIALS):

The coefficients of $z_i(x)$ and $z_i'(x)$ will be drawn as follows: $z_{i,j} \in_R [0, L^{11} H^3]$ and $z'_{i,j} \in_R [0, L^{11} H^4]$. The coefficients of $r_i(x)$ will be drawn as follows:

$$r_{i,j} \in_R [0, L^{11} H^4].$$

Step 6 (OUTPUT): Finally, v(0) will be $L^4 AB$ instead of AB, so participants divide by $L^4$.

Robustness Tools

Proofs of knowledge use the commitment tools chosen in the set up. These tools allow servers to perform efficient constant-round zero-knowledge proofs.

1. Proof of Knowledge of a Discrete Log

A zero-knowledge interactive proof in which a prover $\mathcal{P}$ proves knowledge to a verifier $\mathcal{V}$ of a discrete log (or any isomorphic function) of $X = g^x$ mod P was presented in [GHY85]. Below we demonstrate a similar proof based on a composite modulus, N, and input $X=g^x \mod N$, where $x \in [0 \ldots Z]$, for some $Z \geq 1$.

$\mathcal{P}$ commits to a randomly chosen sp-bit string $c=c_1 \| \ldots \| c_{sp}$ using a Simulator-Equivocal commitment, and also transmits ($g^{q_1} \mod N, \ldots, g^{q_{sp}} \mod N$) where $q_i \in_R [0 \ldots Z]$.

$\mathcal{V}$ sends a randomly chosen sp-bit string $c'=c'_1 \| \ldots \| c'_{sp}$ to $\mathcal{P}$.

$\mathcal{P}$ opens its commitment. For $k=1 \ldots sp$, $\mathcal{P}$ transmits $v_k = d_k x + q_k$, where $d=c \oplus c'$.

For $k=1 \ldots sp$, $\mathcal{V}$ verifies whether $X^{d_k} g^{q_k} \equiv g^{v_k} \mod N$.

2. Proof of Knowledge of a Discrete Log and a Corresponding Representation

For a prover $\mathcal{P}$ to prove that it knows a representation $(x,y)$ of $Y = g_*^x h_*^y / Y \mod N_*$, and that the first part of the representation is equivalent to the discrete log of $X = g^x \mod N$, with $x, y \in [0 \ldots Z]$, the following protocol is used:

$\mathcal{P}$ commits to a randomly chosen sp-bit string $c=c_1 \| \ldots \| c_{sp}$ using a Simulator-Equivocal commitment, and also transmits $((g^{q_1} \mod N, g_*^{q_1} h_*^{q'_1} \mod N_*), \ldots, (g^{q_{sp}} \mod N, g_*^{q_{sp}} h_*^{q'_{sp}} \mod N_*))$ where $q_i, q'_i \in_R [0 \ldots Z(N+N_*)]$.

$\mathcal{V}$ sends a randomly chosen sp-bit string $c'=c'_1 \| \ldots \| c'_{sp}$ to $\mathcal{P}$.

$\mathcal{P}$ opens its commitment. For $k=1 \ldots sp$, $\mathcal{P}$ transmits $v_k = d_k x + q_k$ and $v'_k = d_k y + q'_k$, where $d = c \oplus c'$.

For $k=1 \ldots sp$, $\mathcal{V}$ verifies whether $X^{d_k} g^{q_k} \equiv g^{v_k} \mod N$, and $y^{d_k} g_*^{q_k} h_*^{q'_k} \equiv g_*^{v_k} h_*^{v'_k} \mod N_*$.

3. Proof of Knowledge of Corresponding Representations

For a prover $\mathcal{P}$ to prove that it knows values $y$ and $y'$ such that if $(x,y)$ is a representation of $X = g_*^x h_*^y \mod N_*$ over $g_*$ and $H_*$, and $(x',y')$ is a representation of $Y = g_*^{x'} h_*^{y'} \mod N_*$ over $g_*$ and $h_*$, then $x = x'$, the following protocol is used:

$\mathcal{P}$ commits to a randomly chosen sp-bit string $c=c_1 \| \ldots \| c_{sp}$ using a Simulator-Equivocal commitment, and also transmits $((g_*^{q_1} h_*^{q'_1} \mod N_*, g_*^{q_1} h_*^{q''_1} \mod N_*), \ldots, (g_*^{q_{sp}} h_*^{q'_{sp}} \mod N_*, g_*^{q_{sp}} h_*^{q''_{sp}} \mod N_*))$ where $q_i, q'_i, q''_i \in_R [0 \ldots Z(N+N_*)]$.

$\mathcal{V}$ sends a randomly chosen sp-bit string $c'=c'_1 \| \ldots \| c'_{sp}$ to $\mathcal{P}$.

$\mathcal{P}$ opens its commitment. For $k=1 \ldots sp$, $\mathcal{P}$ transmits $v_k = d_k x + q_k$, $v'_k = d_k y + q'_k$, and $v''_k = d_k y' + q''_k$, where $d = c \oplus c'$.

For $k=1 \ldots sp$, $\mathcal{V}$ verifies whether $X^{d_k} g_*^{q_k} h_*^{q'_k} \equiv g_*^{v_k} h_*^{v'_k} \mod N^*$ and whether $Y^{d_k} g_*^{q_k} h_*^{q''_k} \equiv g_*^{v_k} h_*^{v''_k} \mod N_*$.

4. PROOF OF KNOWLEDGE AND RANGE OF A REPRESENTATION

The protocol below allows a prover $\mathcal{P}$ to prove that it knows values $x$ and $y$ such that $(x, y)$ is a representation of $X = g_*^x h_*^y \mod N_*$ over $g_*$ and $h_*$, where $y \in [0 \ldots Z]$, and $x \in [a-w \ldots b+w]$, where $w = |a-b|$. If $x \in [a \ldots b]$, this protocol is zero-knowledge. (Assume $[a-w \ldots b+w] \subseteq C [9 \ldots Z]$.)

$\mathcal{P}$ commits to a randomly chosen sp-bit string $c=c_1 \| \ldots \| c_{sp}$ using a Simulator-Equivocal commitment, and also transmits $(\{g_*^{q_1} h_*^{q'_1} \mod N, g_*^{q_1-x} h_*^{q''_1} \mod N_*\}, \ldots, \{g_*^{q_{sp}} h_*^{q'_{sp}} \mod N, g_*^{q_{sp}-x} h_*^{q''_{sp}} \mod N_*\})$ where $q_i, \in_R [0, w]$, $q'_i, q''_i \in_R [0 \ldots ZN_*]$. Notice that the pairs are unordered.

$\mathcal{V}$ sends a randomly chosen sp-bit string $c'=c'_1 \| \ldots \| c'_{sp}$ to $\mathcal{P}$.

$\mathcal{P}$ opens its commitment. Let $d = c \oplus c'$. For $k=1 \ldots sp$, if $d_k=1$, $\mathcal{P}$ transmits $q_k$, $q'_k$, and $q''_k$ and otherwise transmits $v_k = x + q_k$ and $v'_k = y + q'_k$, or $v_k = x + q_k - e$ and $v'_k = y + q''_k$ whichever has $v_k \in [a \ldots b]$.

For $k=1 \ldots sp$, if $d_k=1$, $\mathcal{V}$ verifies $q_k \in [0 \ldots e]$ and $g_*^{q_k} h_*^{q'_k} \mod N_*$ and $g_*^{q_k-e} h_*^{q''_k} \mod N_*$ were the components of the kth pair transmitted by $\mathcal{P}$, and otherwise $\mathcal{V}$ verifies $v_k \in [a \ldots b]$ and that $g_*^{q_k} h_*^{v'_k} / \mod N_*$ is equivalent to one of the components of the kth pair transmitted by $\mathcal{P}$.

Robust Distributed Double-Primality Test

The preferred method uses a double-prime test scheme based on a prior one by Boneh-Franklin but modified to be robust and to "chain" the robustness tools to the preceding generation of the value n. In this method, servers can check whether a previously computed value N is the product of two large prime numbers (a condition that is required for using N in certain signature and other cryptographic schemes). To get robustness (e.g., to determine that N is double prime even if one server participating in the protocol is corrupt) the protocol makes use of a polynomial for each server $S_i$ defined as:

$$f_i(x) = a_i(x) + b_i(x) = \sum_{j=0}^{t} f_{i,j} x^j,$$

where $a_i(x)$ and $b_i(x)$ were used to distribute $p_i$ and $q_i$ respectively in the Distributed Computation of N. The preferred method also uses the corresponding check shares used in the Pedersen sharing steps. For description purposes, these check share will be called $\gamma_{i,j}$ for $0 \leq j \leq t$, with $$\gamma_{i,0} = g_*^{L^2(p_i+q_i)} h_*^{(p'_i q'_i)} \mod N_*,$$

where $p'_i$ and $q'_i$ are the companion secrets to $p_i$ and $q_i$, respectively.

The parties repeat the following steps as many times as necessary get the desired security level. Each successful repetition increases the confidence that the computed value N is double prime. A failure of any repetition indicates that N is not double prime, and the servers return to the RESTARTING POINT to compute a new value of N.

1. The shareholders randomly choose $g$ such that:

$(g/n)=1$ where "$(g/n)$" here designates the Jacoby symbol.

2. A first server $S_1$ computes and broadcasts a value $Q_1 = g^{(N+1-p_i-q_i)/4} \mod N.$ Then the first server proves knowledge of the discrete log of $Q_1$ and a corresponding representation of $g_*^{L^2 N+1} \gamma_{1,0}^{-1}$ (over $g_*^{4L^2}$ and $h_*$) using the protocol in PROOF OF KNOWLEDGE OF A DISCRETE LOG.

For each $i \geq 1$ (i.e., remaining servers), each server $S_i$ broadcasts $Q_i = g^{(p_i+q_i)/4} \mod N$. Then it proves knowledge of the discrete log of $Q_i$ and a corresponding representation of $\gamma_{i,0}$ (over $g_*^{4L^2}$ and $h^*$) using the protocol in PROOF OF KNOWLEDGE OF A DISCRETE LOG.

3. All shareholders verify that $Q_1 / \Pi''_{i=2} Q_i \equiv \pm 1 \mod N$. (Here, the symbol "$\equiv$" means "is congruent with.") If it is not congruent, the servers declare that N is not a product of two primes.

Robust Distributed Generation of Public and Private Keys

The key generation step makes use of the relationship that $\phi(N)=N-\sum_{i=1}^{n}(p_i+q_i)+1$ ($\phi(N)$ is the Euler function). The preferred protocol uses one of two procedures, a simple one for small public keys and a more complicated one for larger (general) public keys.

Certain operations can be easily done (while maintaining checking information to assure robustness) if a change of representation of the shared value is first performed. A "poly-to-sum" technique is used which transforms a function shared by a t degree polynomial amongst n servers into a t-out-of-t additive (sum) sharing. A "sum-to-poly" technique which transforms a function shared additively t-out-of-t into a t-out-of-n polynomial sharing. Share representation transformation techniques from [FGMYa] may be employed.

Key Generation for Small Public Keys

For small public keys, e.g., an RSA system where e=3, the following procedure may be used.

1. Shareholders jointly choose $g\in_R[1,N-1]$ using techniques described in SIMULATOR-EQUIVOCAL COMMITMENTS. In this procedure, each server commits to a value $g_i$, and after all participants reveal $g_i$, all participants can compute g as the product of $g_i$.
2. Each shareholder $S_i$ broadcasts "check shares" $g^{p_i+q_i}$ mod N.
3. Each shareholder $S_i$ checks that value against $Q_i^4$ mod N. Actually $S_1$ checks it against $g^{N+1}/Q_1^4$ mod N.
4. Each shareholder $S_i$ reveals $x_i=p_i+q_i$ mod 3.
5. Each shareholder $S_i$ proves knowledge of the discrete log of $x=g^{p_i+q_i}g^{-x_i}$ mod N with base $g''=g^3$ (which can be accomplished using the techniques described in PROOF OF KNOWLEDGE OF A DISCRETE LOG). That is, each shareholder $S_i$ shows that it knows a value r such that $p_i+q_i-x_i=3r$ by showing that it knows the exponent of X with base g".)
6. The next step utilizes the fact that:

$\phi(N)\equiv N+1-\sum_{i=1}^{n}x_i \bmod 3$.

For description purposes, let $r=N+2-\sum_{i=1}^{n}x_i$;

$r'=2N+3-2\sum_{i=1}^{n}x_i$.

All servers can compute these values.

If $\phi(N)\equiv 2 \bmod 3$, the first shareholder $S_1$ computes its share of d as $d_1=(r-(p_1+q_1-x_1)/3$ (case 1), and for $2\leq i\leq n$, each remaining shareholder $S_i$ computes is share of d as $d_i=-(p_i+q_i-x_i)/3$ (case 2).

If $\phi(N)\equiv 1 \bmod 3$, the first shareholder $S_1$ computes its share of d as $d_1=(r'-2(p_1+q_1-x_1))/3$ (case 3), and for $2\leq i\leq n$, each remaining shareholder $S_i$ computes its share of d as $d_i=-2(p_i+q_i-x_i)/3$ (case 4). (Recall that the value d is a secret, and the generation of shares of d without actually generating d is an object of the invention.)
7. All shareholders check that the check shares cubed are correct when compared against the check shares broadcast in step 2. For example, in case 1 above, the first server starts with $g^{d_1}$ and raises it to the power 3. The first server than multiplies the result by the inverse of $g^{r+x_1}$. The result should be equal to the inverse of $g^{p_1+q_1}$ which was broadcast in step 2.
8. A sum-to-poly transformation is performed to construct a (t,n)-secure polynomial sharing of d. The resultant shares can be used as shares of a secret encryption key for, e.g., distributed signing procedures in a root certification authority.

Key Generation for Large Public Keys

For e large, the preferred protocol uses different techniques for finding $(\phi(N))^{-1}$ mod e which are related to ideas described by Boneh and Franklin. The preferred protocol takes advantage of an assumption that a value e can be found that is a prime, with E=2e+1 a (strong) prime. Earlier steps in the method utilized a definition that for $1\leq i\leq n$, $f_i(x)=a_i(x)+b_i(x)$. For description purposes, let $f(x)=L^2(N+1)-\sum_{i=1}^{n}f_i(x)$. Then $f(0)=L^2\phi(N)$. The preferred method proceeds with the following steps.

1. Shareholders jointly choose e randomly (using procedures from SIMULATOR-EQUIVOCAL COMMITMENTS), and test to see that e and 2e+1 are prime.
2. Shareholders jointly choose $g_e, h_e \in_R Z^*_E$ (again using procedures from SIMULATOR-EQUIVOCAL COMMITMENTS).
3. Shareholders jointly choose $g, h \in Z^*_N$ (using procedures from SIMULATOR-EQUIVOCAL COMMITMENTS). (Shareholders may choose polylog of them and repeat the checking process with all of them, which assures generators of large order.)
4. Each shareholder $S_i$ chooses $m_i \in_R [0,H]$, and performs a Shamir sharing of $m_i$ over the integers. For description purposes, let $m=m_1+\ldots+m_n$.

Then m will be random. Using addition of shares, shareholders can hold the share of the addition. For the purpose of description, this added polynomial will be called fm, where $fm(0)=L^2m$ as its zero coefficient.
5. The shareholders perform a MULTIPLICATION OVER A FINITE FIELD (order e) to calculate $D=L^4\phi(N)m$ mod e (with all values of the Shamir sharing of each $m_i$ taken mod e). This is done by multiplying f and fm. For notation purposes, let $INV=D^{-1}$ mod e, which is easily calculated from the public value D. (Note that D has been "randomized" by the value of m and looks arbitrary so that its public availability will not give away information about $\phi(N)$).
6. For each i,j, each shareholder $S_i$ multiplies its integer share of $m_j$ by INV. (Note that m is the sum of $m_i$ and there is a polynomial for each $m_i$, therefore, the protocol produces a "sum-of-poly" representation.) This gives the servers integer sharings of polynomials whose sum contains a secret:

$W\equiv(L^4\phi(N))^{-1} \bmod e$ which, when multiplied by $L^2$, is the sum polynomials value at zero.
7. The shareholders perform a multiplication over the integers with check shares over N (of this latest polynomial and f(x)) to get a polynomial sharing with—$L^4W\phi(N)+1$ in the zero coefficient. (To add one, simply add one to all the resulting shares; to multiply by −1, multiply all shares by −1.) Then, instead of revealing the shares of the resulting polynomial, shareholders reveal those shares only in the exponent. For example, assuming the resulting polynomial is v(x) and the resulting companion polynomial is v'(x), instead of $S_i$ revealing v(i) and v'(x), it reveals $g^{v(i)}$ mod N and $h^{v'(i)}$ mod N, and proves that it knows the actual shares using the protocol from PROOF OF KNOWLEDGE OF A DISCRETE LOG. Note that $v(0) \equiv ((-1)+1)=0 \mod e$, and $v(0) \equiv 1 \mod \phi(N)$.

8. The shareholders perform a poly-to-sum to have the secret sum distributed to t+1 shareholders.
9. The t+1 shareholders divide their additive shares by e, and publish the remainders. Also they publish the check shares for the new additive shares. (All shareholders should check these check shares by raising them to the e power and comparing them to the original additive shares $g^{v(0)}$.) The remainders will sum to a multiple of e. One of the shareholders adds this multiple to its additive share. Then these shareholders collectively hold an additive sharing of d.
10. The t+1 shareholders perform a sum-to-poly to construct a (t,n)-secure polynomial sharing of d.

Efficiency of the Protocol and Variations

In typical systems, h can be on the order of 1000 (i.e., 1024-2048). Working over the integers will add Less than 400 to the size of exponents, assuming that assurance of $2^{-40}$ is reasonable. It can be expected that the value n will be less than 10, and $2-k^{-4}$ chance of error on proofs with k=40 to be sufficient assurance of correctness.

The probability of generating an RSA modulus from two random primes of sp/2 bits each is about $(sp/2)^{-2}$, so the procedure is expected to repeat for about $sp^2/4$ rounds. The communication complexity of each round is bounded by $O(nk(sp))$ and the computational complexity of each round is about $O(n(k+t))$ modular exponentiations. Given realistic values of k and t, the computational complexity is dominated by the multiplication protocol and would be about $24n(t+1)$ modular exponentiations. Not much efficiency can be gained by performing trial division as discussed by Boneh and Franklin, since each trial against a small prime would involve a robust multiplication, and thus around $O(ntB/lnB)$ modular exponentiations for each distributed integer tested.

Numerous practical improvements can be made. First, trial division can be done once a possible N is generated, and this would eliminate many distributed double-primality tests. Also, if the test that each $p_i$ and $q_i$ are in the correct range is done after this trial division, then many of those can be saved. (In this case, N needs to be tested to make sure it is in a possible range, so that flagrant misbehavior of shareholders can be determined.)

Perhaps the largest improvement would come from revealing the value of each $p_i$ mod-the-product-J-of-small-primes-up-to some-B, and assuming the shared value is a multiple of the J. The sum of the revealed values could be tested to see if it is divisible by any of the small primes up to B. If so, the distributed integer would not be prime and would be thrown out. Of course, this reduces security, so it would preferably be done for primes up to, e.g., 7. This reduces the security by about 6 bits $(\log((2-1)(3-1)(5-1)(7-1)))$, but would increase the probability that the number is prime by a factor of about 5, and thus reduce the expected number of rounds for the protocol by a factor of about 25. (If the reduction in security is worrisome, sp could be slightly increased without affecting the running time significantly. Or one could only use primes 2 and 3, reducing the security by about 1 bit, while reducing the expected number of rounds for the protocol by about 6.)

With the improvements described above, the total number of modular exponentiations in the protocol will be about $24n(t+1)$ times $(sp/10)^2$ (reduced from $(sp/2)^2$ because of the substitute for trial division), which is about 10,000. For the case n=4 and t=1, there are 2,000,000 modular exponentiations. The non-robust protocol of Boneh-Franklin using trial division up to 8,103 performs about 484 modular exponentiations, about a factor of 4000 less.

If it is likely that all parties are honest, one can increase performance by performing "optimistic execution". The idea is to run the protocol (plus the trial division from Boneh-Franklin) but without any checking information. That is, there would be no companion polynomials or verification shares generated. At the end of each round in which the participants failed to produce an RSA modulus, they reveal all their information from the round. If all participants agree that the information revealed is correct, then there has been no cheating in that round, and they proceed. If cheating is ever found, they revert to the robust protocol described in this paper. If an RSA modulus is found, then they rerun the round using the same polynomials sharings, but including the robustness checks (i.e., companion polynomials, verification shares, proofs of knowledge). If all the information is verified correctly, then they use the RSA modulus. Otherwise, cheating has occurred and they revert to the robust protocol.

The problem with this "mode" of operation is that cheating can be detected, but it is impossible to determine exactly which participant cheated. To determine who cheated, one can require that participants sign their messages to other participants, and have recipients of messages either accept the signature or ask the sender to reveal the message to everyone. Assuming the signatures are RSA signatures on participants private keys, one can assume that they require a single modular exponentiation. Furthermore, one could use one signature per round, or even over multiple rounds, to reduce the number of modular exponentiations. In all, this method will still be robust and secure (with some standard assumptions about security and robustness of signatures and encryptions), but require only about $n^2$ times the modular exponentiation of the non-robust protocol, where n is the number of participants. (Note that this only works when n is greater than 3t+1], because one cannot use zero knowledge [ZK] proofs to guarantee correct shares in the multiplication protocol.)

Performance can also be improved by using a faster modular exponentiation algorithm, as in [BGM], since in these robust protocols, participants will be performing many exponentiations over the same base and modulus.

Another source of efficiency may come from collapsing rounds in the zero-knowledge proofs by using the known method of self-challenging string derived from a common one-way hash function believed to be computationally indistinguishable from a random oracle [FS86].

The supporting protocols can be combined to improve many of the applications of mathematical operations over distributed values or cryptographic keys. Such operations involve multiplication, inversion, additional, and exponentiation. One example mentioned above is the DSS distributed protocol.

Variations on the Protocol

Once a composite N is established there are numerous ways to use it in various cryptographic protocols other than as a distributed RSA system:

1. The parties can initiate a "composite ElGamal" system. They draw a random element g and generate public key $y=g^x$ where x is shared among the parties using either an additive or polynomial sharing scheme.

2. Users register for an identification protocol by using the availability of N to generate a quadratic residue for which they keep the root as a secret.
3. Users can engage in the Yao's secret bit exchange protocol, where they both encrypt the value under N and simultaneously reveal the decryption bit by bit.
4. Using (e, N), users can use RSA as a public commitment scheme (i.e., using it as a one-way function) which cannot be opened unless the majority wants to do it. One application for this is the escrow of plain texts.

The invention claimed is:

1. An electronic method for generating shares of a cryptographic value, comprising:
    (a) selecting a group of initial participants to participate in generating shares of the cryptographic value;
    (b) initiating the initial participants to perform a process of first, second, and third protocols, the protocols being stored in a computer or computer readable medium, where (i) the first protocol is constructed to compute a number N, (ii) the second protocol is constructed to test the value N for double primality without revealing the factors of N to the participants, (iii) the third protocol is constructed to compute shares of the cryptographic value without revealing the cryptographic value to the participants; and (iv) the process includes procedures to detect whether a participant has deviated from a protocol;
    (c) commencing the process of performing the protocols; and
    (d) checking, for at least one of the first, second, and third protocols, whether a participant has deviated from the first, second, and third protocols, respectively.

2. The method of claim 1 where the process restarts with a revised set of participants before the initial participants complete the third protocol.

3. The method of claim 1 where N is an RSA modulus, and the cryptographic value is an RSA key.

4. The method of claim 1 wherein the first protocol comprises:
    having each participant generate two values pi, qi;
    having each participant ostensibly share its respective values pi, qi with other participants without revealing the values pi, qi to the other participants;
    having participants compute N from shares of their respective values pi, qi.

5. The method of claim 4 further comprising checking whether a participant has deviated from the first protocol.

6. The method of claim 5 where checking whether a participant has deviated from the first protocol involves having each participant prove that its respective values pi, qi lie within a range.

7. The method of claim 5 where checking whether a participant has deviated from the first protocol involves having each participant prove that it has knowledge of its respective values pi, qi.

8. The method of claim 4 where the second protocol comprises:
    having a first participant communicate to at least one other participant a value Qi that ostensibly is derived from values p1, q1 which the first participant shared with other participants;
    having a second participant communicate to at least one participant other than the second participant a value Qi that ostensibly is derived from the values pi, qi of the second participant;
    where participants can test whether N is a product of two prime numbers using the values Q1 and Qi; and
    checking whether a participant has deviated from the second protocol.

9. The method of claim 8 where:
    the value Q1 satisfies the relationship $Q1 = g^{(N+1-p1-q1)/4}$;
    the value Qi satisfies the relationship $Qi = g^{(pi+qi)/4}$;
    g satisfies the relationship $(g/N) = 1$;
    "(g/N)" designates the Jacobi symbol; and
    participants can test whether N is a product of two prime numbers by testing whether Q1 and Qi satisfy a mathematical relationship.

10. The method of claim 9 where checking whether a participant has deviated from the second protocol involves having participants prove knowledge relating to their respective values Q1, Qi.

11. The method of claim 9 where checking whether a participant has deviated from the second protocol involves having participants prove knowledge of a discrete logarithm of their respective values Q1, Qi.

12. The method of claim 8 where checking whether a participant has deviated from the second protocol involves having participants prove knowledge of secret information used to share their respective secret values pi, qi.

13. The method of claim 12 where checking whether a participant has deviated from the second protocol involves having participants prove knowledge relating to coefficients of a polynomial used to share their respective secret values pi, qi.

14. The method of claim 8 where checking whether a participant has deviated from the second protocol involves having participants prove knowledge of a representation relating to information used to share their respective secret values pi, qi.

15. The method of claim 8 where checking whether a participant has deviated from the second protocol involves having participants prove knowledge of a representation relating to coefficients of a polynomial used to share their respective secret values pi, qi.

16. The method of claim 8 where checking whether a participant has deviated from the second protocol involves having participants prove knowledge of a representation relating to coefficients of a polynomial used to share their respective secret values pi, qi and coefficients of a polynomial used to share companion secrets to the secret value pi, qi.

17. The method of claim 8 where the third protocol comprises
    selecting a value e; and
    having participants compute shares di of the cryptographic value d without revealing the cryptographic value d; where
    $ed = 1 \mod \phi$;
    $\phi = (p-1)(q-1)$;
    $p = \Sigma pi$; and
    $q = \Sigma qi$.

18. The method of claim 17 further comprising checking whether a participant has deviated from the third protocol.

19. The method of claim 18 where checking whether a participant has deviated from the third protocol involves having a participant prove knowledge related to its respective secret values pi, qi.

20. The method of claim 17 where:
    participants jointly select a modulus g using a commitment mechanism;
    each participant transmits a p-q-check share in the form:
    p-q-check share $= g^{(pi+qi) \mod N}$; and checking whether a participant has deviated from the third protocol involves comparing a participant's p-q-check share to a value Q communicated during the second protocol.

21. The method of claim 20 where:
each participant transmits a d-check share in the form:
d-check share=$g^{di}$ mod N; and
checking whether a participant has deviated from the third protocol involves testing whether a participant's d-check share and p-q-check share satisfy a mathematical relationship.

22. The method of claim 20 where:
participants select a modulus using a commitment mechanism; and
checking whether a participant has deviated from the third protocol involves revealing a participant's commitment.

23. The method of claim 17 where:
participants jointly select the value e using a commitment mechanism; and
checking whether a participant has deviated from the third protocol involves revealing a participant's commitment.

24. A system for generating a digital signature, said system comprising
a plurality of computers, a plural number of said computers using shares of a signature key to form partial signature values, said partial signature values being combinable to form a digital signature;
wherein said shares of the digital signature key are characterized by having been generated by steps of:
(a) selecting a group of initial participants to participate in generating shares of a signature key;
(b) initiating the initial participants to perform a process of first, second, and third protocols, where (i) the first protocol is constructed to compute a number N, (ii) the second protocol is constructed to test the value N for double primality without revealing the factors of N to the participants, (iii) the third protocol is constructed to compute shares of the digital signature key without revealing the digital key to the participants; and (iv) the process includes procedures to detect whether a participant has deviated from a protocol;
(c) commencing the process of performing the protocols; and
(d) checking whether a participant has deviated from any of the first, second, and third protocols.

25. The system of claim 24 wherein the digital signature is of a public key certificate.

26. The system of claim 24 where the process restarts with a revised set of participants before the initial participants complete the third protocol.

27. The system of claim 24 where N is an RSA modulus, and the cryptographic value is an RSA key.

28. The system of claim 24 wherein the first protocol comprises:
having each participant generate two values pi, qi;
having each participant ostensibly share its respective values pi, qi with other participants without revealing the values pi, qi to the other participants;
having participants compute N from shares of their respective values pi, qi.

29. The system of claim 28 further comprising checking whether a participant has deviated from the first protocol.

30. The system of claim 29 where checking whether a participant has deviated from the first protocol involves having each participant prove that its respective values pi, qi lie within a range.

31. The system of claim 29 where checking whether a participant has deviated from the first protocol involves having each participant prove that it has knowledge of its respective values pi, qi.

32. The system of claim 28 where the second protocol comprises:
having a first participant communicate to at least one other participant a value Q1 that ostensibly is derived from values p1, q1 which the first participant shared with other participants;
having a second participant communicate to at least one participant other than the second participant a value Qi that ostensibly is derived from the values pi, qi of the second participant;
where participants can test whether N is a product of two prime numbers using the values Q1 and Qi; and
checking whether a participant has deviated from the second protocol.

33. The system of claim 32 where:
the value Q1 satisfies the relationship $Q1=g^{(N+1-p1-q1)/4}$;
the value Qi satisfies the relationship $Qi=g^{(pi+qi)/4}$;
g satisfies the relationship (g/N)=1;
"(g/N)" designates the Jacobi symbol; and
participants can test whether N is a product of two prime numbers by testing whether Q1 and Qi satisfy a mathematical relationship.

34. The system of claim 33 where checking whether a participant has deviated from the second protocol involves having participants prove knowledge relating to their respective values Q1, Qi.

35. The system of claim 33 where checking whether a participant has deviated from the second protocol involves having participants prove knowledge of a discrete logarithm of their respective values Q1, Qi.

36. The system of claim 32 where checking whether a participant has deviated from the second protocol involves having participants prove knowledge of secret information used to share their respective secret values pi, qi.

37. The system of claim 36 where checking whether a participant has deviated from the second protocol involves having participants prove knowledge relating to coefficients of a polynomial used to share their respective secret values pi, qi.

38. The system of claim 32 where checking whether a participant has deviated from the second protocol involves having participants prove knowledge of a representation relating to information used to share their respective secret values pi, qi.

39. The system of claim 32 where checking whether a participant has deviated from the second protocol involves having participants prove knowledge of a representation relating to coefficients of a polynomial used to share their respective secret values pi, qi.

40. The system of claim 32 where checking whether a participant has deviated from the second protocol involves having participants prove knowledge of a representation relating to coefficients of a polynomial used to share their respective secret values pi, qi and coefficients of a polynomial used to share companion secrets to the secret value pi, qi.

41. The system of claim 32 where the third protocol comprises selecting a value e; and having participants compute shares di of the cryptographic value d without revealing the cryptographic value d; where $ed = 1 \mod \phi$;

$\phi = (p-1)(q-1)$;

$p = \Sigma p_i$; and $q = \Sigma q_i$.

42. The system of claim 41 further comprising checking whether a participant has deviated from the third protocol.

43. The system of claim 42 where checking whether a participant has deviated from the third protocol involves having a participant prove knowledge related to its respective secret values pi, qi.

44. The system of claim 41 where:

participants jointly select a modulus g using a commitment mechanism;

each participant transmits a p-q-check share in the form: p-q-check share = $g^{(pi+qi)} \mod N$; and checking whether a participant has deviated from the third protocol involves comparing a participant's p-q-check share to a value Q communicated during the second protocol.

45. The system of claim 44 where:

each participant transmits a d-check share in the form: d-check share = $g^{di} \mod N$; and checking whether a participant has deviated from the third protocol involves testing whether a participant's d-check share and p-q-check share satisfy a mathematical relationship.

46. The system of claim 44 where:

participants select a modulus using a commitment mechanism; and checking whether a participant has deviated from the third protocol involves revealing a participant's commitment.

47. The system of claim 41 where:

participants jointly select the value e using a commitment mechanism; and checking whether a participant has deviated from the third protocol involves revealing a participant's commitment.

* * * * *